United States Patent [19]

Christe

[11] 3,873,676

[45] Mar. 25, 1975

[54] PROCESS FOR PREPARING STABLE CHLORINE TRIFLUORIDE DIOXIDE

[75] Inventor: Karl O. Christe, Calabasas, Calif.

[73] Assignee: North American Rockwell Corporation, Canoga Park, Calif.

[22] Filed: Sept. 18, 1972

[21] Appl. No.: 290,031

[52] U.S. Cl. .................................. 423/466, 149/1
[51] Int. Cl. ............................................ C01b 7/24
[58] Field of Search ......................... 149/1; 423/466

[56] References Cited
UNITED STATES PATENTS 3,320,031  5/1967  Grosse et al. ...................... 423/466

Primary Examiner—Leland A. Sebastian
Attorney, Agent, or Firm—L. Lee Humphries; Robert M. Sperry

[57] ABSTRACT

A stable form of chlorine trifluoride dioxide is disclosed for use as an oxidizer in formulating energetic compositions, such as propellants. The stable $ClF_3O_2$ is produced by reacting a $ClO_2F_2^+$ salt with a strong Lewis base at $-78°C$.

7 Claims, No Drawings

PROCESS FOR PREPARING STABLE CHLORINE TRIFLUORIDE DIOXIDE

BACKGROUND OF THE INVENTION

The invention herein described was made in the course of or under a contract with the Department of the Navy.

1. Field of Invention

This invention relates to compositions of matter and is particularly directed to a stable form of chlorine trifluoride dioxide and a method of producing the same.

2. Prior Art

Energetic compositions of matter are useful in providing energy sources for rocket engines, guided missiles, auxiliary power units for aircraft, ordnance, demolition and the like. Such compositions conventionally are produced by mixing a fuel with an oxidizer. Obviously, the energy of such compositions results primarily from the oxidation of the fuel. Hence, it is desirable to provide a highly energetic oxidizing agent. On the other hand, it is equally desirable that the oxidizing agent by a stable material, so as to prevent accidental or unintentional ignition or explosive decomposition of the composition. Numerous organic and inorganic compounds have been proposed heretofore for use as such oxidizing agents. However, it has been found that, as a general rule, stable compounds are low energy oxidizers and high energy oxidizers are unstable. Thus, although some useful oxidizing agents have been disclosed by the prior art, the search for a stable, high-energy, oxidizing material has continued. In recent years, studies have indicated that halogen oxyfluoride materials might provide a satisfactory oxidizing material. However, although empirical formulas may be stated for such materials and some of the properties of such materials may be predicted, the synthesis of these materials has proven to be extremely difficult and it is sometimes found that several materials, each having distinct structures and properties, are defined by a single empirical formula. Thus, U.S. Pat. No. 3,285,842 discloses a process for producing a material having the empirical formula chlorine trifluoride dioxide, $ClF_3O_2$, which the patent states to be violet liquid which is unstable at temperatures above $-72°C$. While it would be expected that this material would be a highly energetic oxidizing agent, the lack of stability renders it unsafe for use in the produciton of propellants and the like.

BRIEF SUMMARY AND OBJECTS OF INVENTION

These disadvantages of the prior art are overcome with the present invention and a compostion of matter is disclosed which is a form of chlorine trifluoride dioxide, yet which is stable at temperatures up to at least $+25°C$ and, hence, can be safely employed for manufacturing propellants and the like. In addition, a method is disclosed for producing this stable form of chlorine trifluoride dioxide by reacting $ClF_2O_2{}^+PtF_6{}^-$ with a strong Lewis base at a temperature of about $-78°C$ and separating the products of the reaction by distillation.

Accordingly, it is an object of the present invention to provide a new composition of matter.

Another object of the present invention is to provide a form of chlorine trifluoride dioxide which is stable at ambient temperatures.

A further object of the present invention is to provide a form of chlorine trifluoride dioxide which is safe for use in the production of propellants and the like.

An additional object of the present invention is to provide a method of producing a stable form of chlorine trifluoride dioxide. A specific object of the present invention is to provide a form of chlorine trifluoride dioxide which is stable at temperatures up to at least $+25°C$ by reacting $ClF_2O_2{}^+$ salts with nitryl fluoride at a temperature of about $-78°C$ and separating the products of the reaction by distillation.

These and other objects and features of the present invention will be apparent from the following detailed description.

DETAILED DESCRIPTION OF PREFERRED EMBODIMENT

In that form of the present invention chosen for purposes of illustration, stable chlorine trifluoride dioxide has been produced by reacting a $ClF_2O_2{}^+$ salt, such as $ClF_2O_{115}PtF_6{}^-$, with a strong Lewis base at $-78°C$.

EXAMPLE I

A sample of $ClO_2{}^+PtF_6{}^-$ containing about 10% of $ClF_2O_2{}^+PtF_6{}^-$ was treated at $-78°C$ in a sapphire reactor with a large excess of FNO for several days. No material noncondensible at $-196°C$ (i.e., $F_2$) was observed. The products, volatile at $25°C$ were removed and separated by fractional condensation through a series of traps kept at $-126°C$, $-142°C$, and $-196°C$. The $-142°C$ fraction contained a novel compound which was identified by its infrared spectrum as $ClF_3O_2$. The observed frequencies are listed in Table I and are in excellent agreement with those expected for a trigonal bypyramidal structure of symmetry $C_{2v}$.

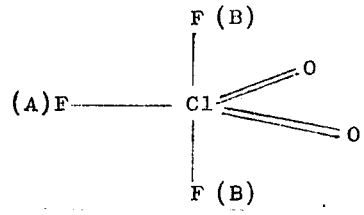

This structure was confirmed by $^{19}F$ nuclear magnetic resonance spectroscopy. The observed signal consisted of a typical $AB_2$ pattern centered at $-413$ ppm relative to the external standard $CFCl_3$. The F-F coupling constant was measured to be 443 Hz. The $B_2$ part of the $AB_2$ pattern occurs downfield from the A part, proving that the $B_2$ fluorine atoms occupy the two axial positions. Additional structural proof was obtained from the Raman spectrum of the gas and the liquid showing strong absorptions at 1096, 684, 548, 527, 493, 290, and 229 cm$^{-1}$. The molecular weight of the compound was confirmed by vapor density measurements (measured, 122; calculated, 124).

Table I

| Infrared Spectrum of $ClF_3O_2$ and its Tentative Assignment | | |
|---|---|---|
| Frequency (cm$^{-1}$) | Intensity | Assignment for Point Group $C_{2v}$ |
| 1334 | s | $\nu_{10}$ ($B_2$), $\nu asClO_2$ |
| 1096 | s | $\nu_1$ ($A_1$), $\nu symClO_2$ |
| 699 | vs | $\nu_7$ ($B_1$), $\nu asClF_2Ax$ |
| 687 | vs | $\nu_2$ ($A_1$), $\nu ClF$ |
| 598 | ms | $\nu_{11}$ ($B_2$), $\delta rock\ ClO_2$ |
| 543 ) | | |
| 532 ) | mw | $\nu_3$ ($A_1$) and $\nu_8$ ($B_1$) |

The solid residue obtained from the FNO displacement reaction showed the correct weight change expected for conversion into $NO^+PtF_6^-$. Its identity as $NO^+PtF_6^-$ was confirmed by infrared spectroscopy.

The stable chlorine trifluoride dioxide is white as a solid having a melting point of −81.2°C and colorless as a liquid having a boiling point of −21°C. It appears to be stable at 25°C. The observed stability and lack of color demonstrate that our product cannot be identical with the previously reported deeply violet and unstable $ClF·O_2F_2$ and $ClF_3·O_2$ addition compounds supposedly having the empirical composition $ClF_3O_2$.

EXAMPLE II

A sample of $ClO_2^+{}_{PtF_6}{}^-$ containing about 10% of $ClO_2F_2^+{}_{PtF_6}{}^-$ was treated with a sufficient quantity of $FNO_2$ to maintain a liquid phase at −78°C in a stainless steel reactor for up to 12 hours. This reaction yielded solid $NO_2^+{}_{PtF_6}{}^-$ and gaseous $ClF_3O_2$ plus $FClO_2$. If desired, the chlorine trifluoride dioxide may then be separated by conventional distillation techniques, as in a multi-plate distillation tower.

Small amounts of material were purified by combining the $ClF_3O_2$ and $FClO_2$ at −196°C with a samll excess of $BF_3$. These materials were allowed to mix and warm to ambient temperature. This results in $ClF_2O_2^+{}_{BF_4}{}^-$, which is stable, plus $ClO_2^+{}_{BF_4}{}^-$, which has a dissociation pressure of 182 millimeters at 22°C and which can be rmoved by pumping. The $ClF_2O_2^+{}_{BF_4}{}^-$ is then reacted with sufficient $FNO_2$ to maintain a liquid phases at −78°C for up to 12 hours. This reaction produced solid $No_2^+{}_{BF_4}{}^-$ plus gaseous $ClF_3O_2$. the two gases may be pumped off and separated by passing the gases through a pair of traps maintained at −126°C and −196°C, respectively. The chlorine trifluoride dioxide will be caught in the −126°C trap.

Obviously, numerous variations and modifications may be made without dparting from the present invention. Accordingly, it should be clearly understood that the forms of the present invention described above are illllustrative only and are not intended to limit the scope of the present invention.

What is claimed is:

1. The method of producing stable chlorine trifluoride dioxide comprising the steps of:

reacting a $ClF_2O_2^+$ salt with a strong Lewis base compatible with $ClF_3O_2$.

2. The method of claim 1 wherein said salt is $ClF_2O_2^+{}_{PtF_6}{}^-$.

3. The method of claim 1 wherein said salt is $ClF_2O_2^+{}_{BF_4}{}^-$.

4.. The method of claim 1 wherein said reaction step is carried out at −78°C.

5. The method of claim 1 wherein the quantity of the Lewis base is sufficient to maintain the reaction in a liquid phase.

6. The method of claim 1 wherein the Lewis base is $FNO_2$.

7. The method of claim 1 wherein the Lewis base is FNO.

* * * * *